Oct. 19, 1954  H. T. LAMB  2,692,105
SUPPORT FOR MIXING MACHINES USED AS MINCING MACHINES
Filed Nov. 15, 1951  2 Sheets-Sheet 1

Inventor
Harold Thomas Lamb
By
Alexander Dowell
Attorneys

Oct. 19, 1954 H. T. LAMB 2,692,105
SUPPORT FOR MIXING MACHINES USED AS MINCING MACHINES
Filed Nov. 15, 1951 2 Sheets-Sheet 2

Inventor
Harold Thomas Lamb
By Alexander Mayell
Attorneys

Patented Oct. 19, 1954

2,692,105

UNITED STATES PATENT OFFICE 2,692,105

SUPPORT FOR MIXING MACHINES USED AS MINCING MACHINES

Harold Thomas Lamb, Benton, Newcastle-upon-Tyne, England

Application November 15, 1951, Serial No. 256,446

Claims priority, application Great Britain April 7, 1951

1 Claim. (Cl. 248—19)

This invention relates to rotary food preparation machines capable of carrying out two or more different operations such as mixing and mincing of the kind comprising a base and a driving shaft projecting at right angles to said base wherein one operation such as mixing is carried out with the machine in one position with its driving shaft vertical, and the other operation such as mincing with the machine swung through a right angle so that the driving shaft is horizontal.

The object of the invention is to provide supporting means for the machine when in its mincing position which will also function as a handle for assisting in the moving of the machine when in its mixing position with its shaft vertical and which will be entirely independent of the moving parts of the machine.

According to the invention pillar means are mounted on the machine base or casing, and a transverse handle member provided at the upper end of said pillar means, said handle member lying in a plane substantially parallel with the adjacent edge of the machine base, while supporting feet project laterally from points adjacent the ends of said machine base, at least a portion of the outside of said handle member lying in a plane with the extremities of said supporting feet, which plane is parallel with the plane containing the axis of the said driving shaft, so that when the machine is swung through a right angle the machine is supported by said supporting feet and said handle portion, and the base occupies a vertical position with the driving shaft horizontal.

The invention will now be described by way of example with reference to the accompanying drawings which show a machine comprising a swinging arm mounted on a pillar which is parallel with the driving shaft, the swinging arm carrying a dolly or the like which co-operates with the rotating mixing bowl to effect mixing.

Figure 1:
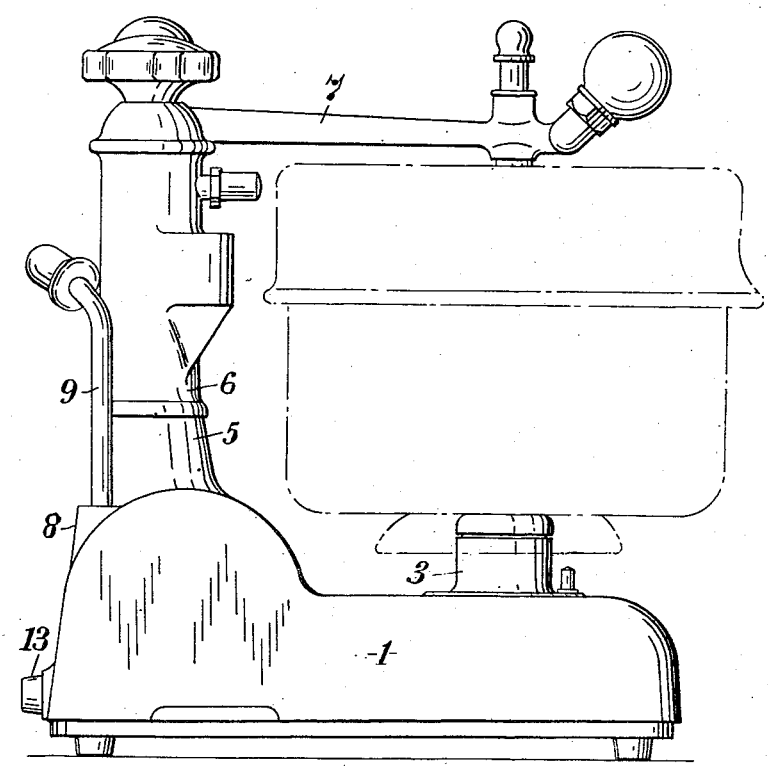
Fig. 1 is a side elevation of the machine in the mixing position.

Referring more particularly to the drawings 1 is the casing or base of the machine and 2 the vertical driving shaft which is surrounded by a boss 3 for receiving the input end of a mincer 4. 5 is a vertical pillar about which is rotatably mounted a sleeve 6 rigid with which is a swinging arm 7.

On either side of the pillar 5, adjacent the rear edge of the machine casing or base there is formed a vertical boss 8 which is bored to receive the end of one of the arms of an inverted U-member 9, the extremities of the said arms being reduced and threaded to receive nuts 11 and washers 12 on the inside of the casing, for holding the U-member 9 in position.

The mid-portion of the U-member 9 is bent outwards at 9a in the form of a wide V whose apex is in vertical alignment with the outer extremities of a pair of rubber feet 13 which project laterally from the rear face of the casing 1. Before the U-member 9 is placed in position it has passed over it a thick sleeve 14 of rubber or other resilient material which serves both as a shock absorber and a comfortable handle grip.

Figure 2:
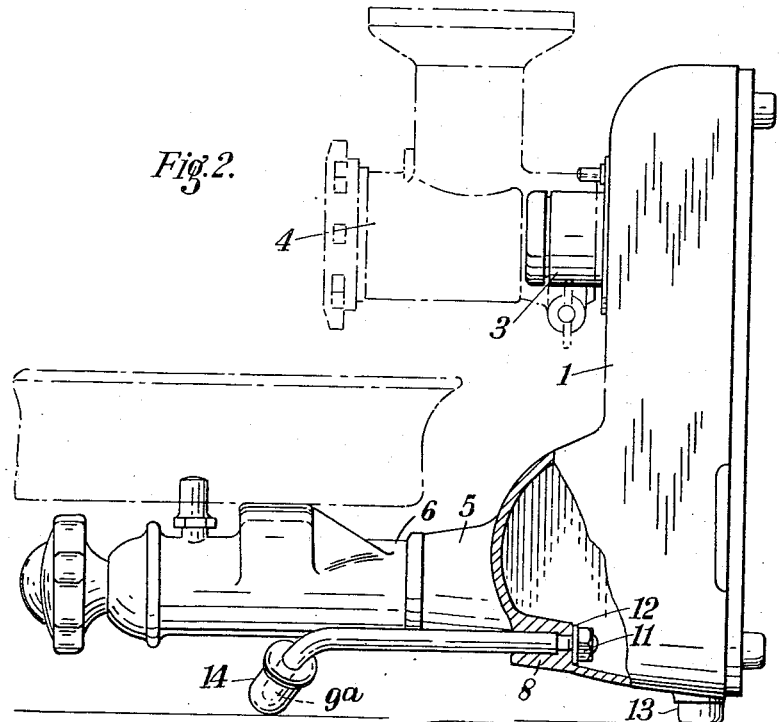
Fig. 2 is a similar view to Fig. 1 but with the machine in the mincing position.
Figure 3:
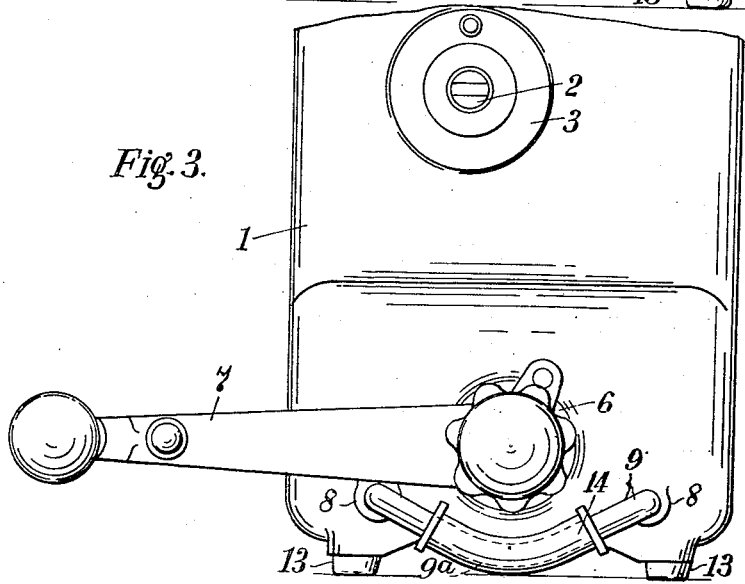
Fig. 3 is a face view of Fig. 2.

When the machine is in the mixing position as shown in Fig. 1 with the driving shaft 2 vertical, the U-member 9 serves as a handle to assist in moving the machine; while when the machine is swung through a right angle for mincing, as shown in Figs. 2 and 3, so that the driving shaft 2 is now horizontal, the apex 9a of the V of the handle acts as a rest which in conjunction with the feet 13 on the rear face of the base 1 maintains the machine with its driving shaft horizontal.

Alternative forms of the combined handle and support may consist in a pair of pillars and a cross bar; or in a single pillar and a cross bar or knob on the upper end of the pillar; while a portion of the said cross bars or knob acts as the supporting foot.

What I claim is:

In a machine for mixing and mincing foods having a base housing and a pillar normal thereto, said base having a boss disposed adjacent one end thereof, laterally spaced supporting feet thereon, said boss having spaced bores therein, a pair of arms disposed substantially parallel with the pillar, means fixedly securing the lower ends of the arms in said bores; the outer ends of the arms being connected by a bight in the form of an offset V whose apex is disposed in the plane of the said supporting feet and which plane is substantially parallel to said pillar, said bight and said feet serving as a three-point support for said machine.

References Cited in the file of this patent

UNITED STATES PATENTS

| Number | Name | Date |
|---|---|---|
| 2,502,564 | Hansson | Apr. 4, 1950 |
| 2,551,670 | Hansson | May 8, 1951 |
| 2,594,936 | Lamb | Apr. 29, 1952 |

FOREIGN PATENTS

| Number | Country | Date |
|---|---|---|
| 53,175 | France | Oct. 7, 1943 |
| 248,426 | Switzerland | Feb. 16, 1948 |